INVENTORS
ARIE SLOB
HENDRIK A. VAN ESSEN
BY
Frank R. Trifari
AGENT

INVENTORS
ARIE SLOB
HENDRIK A. VAN ESSEN
BY
Frank R. Trifari
AGENT

United States Patent Office 3,525,083

Patented Aug. 18, 1970

3,525,083
INTEGRATED CIRCUIT READING STORE MATRICES

Arie Slob and Hendrik Arie van Essen, Emmasingel, Eindhoven, Netherlands, assignors, by mesne assignments, to U.S. Philips Corporation, New York, N.Y., a corporation of Delaware Filed May 4, 1967, Ser. No. 636,082
Claims priority, application Netherlands, May 19, 1966, 6606910
Int. Cl. G11c *11/40, 17/00;* H01l *5/00*
U.S. Cl. 340—173 6 Claims

ABSTRACT OF THE DISCLOSURE

A read only permanent storage matrix using transistors at the crossover points is fabricated, together with conductors, in the form of a plate shaped body having an emitter and base regions of each transistor on one side of the plate and collector regions of each transistor commonly connected on the other side of the plate. The relatively high conductivity of the emitter and base regions is used to form the connecting conductor at coordinate conductor crossover points.

The invention relates to semiconductor reading store matrices.

Reading store matrices are already known including a plurality of input conductors and a plurality of output conductors crossing the input conductors, coupling elements in the form of crystal rectifiers being included between the input and output conductors at predetermined crossings.

Such store matrices are used as code converters in, for example, computers. If, for example, pulses are fed to one or more input conductors these pulses are passed on, dependent upon the predetermined coupling pattern, to determined output conductors resulting in a determined output code.

The present invention provides an improvement in such an arrangement.

According to the invention the coupling elements are in the form of transistors which, together with the conductors, are integrated to form a plate-shaped body, the emitter and base regions of the transistors being formed on one side of the plate and being connected to the output and input conductors respectively, which have the form of relatively insulated electrode layers, the collector regions being through-connected in common on the other side of the plate.

In addition to the fact that the store matrix can be manufactured in a simple manner as an integrated circuit and can be given very small dimensions, the invention affords the advantage that energy amplification occurs in the transistors and hence the control power is comparatively low.

The electrode layers are preferably formed, via an insulating intermediate layer, on a plate of semiconductor material in which the emitter and base regions of the transistors are formed on one side of the surface by local diffusion using the insulating layer as a mask, the electrode layers establishing connections to the relevent regions through apertures in the insulating layer and the collector regions being formed by the remaining part of the body.

In order that the invention may be readily carried into effect one embodiment thereof will now be described in detail, by way of example, with references to the accompanying diagrammatic drawings, in which.

Figure 1:
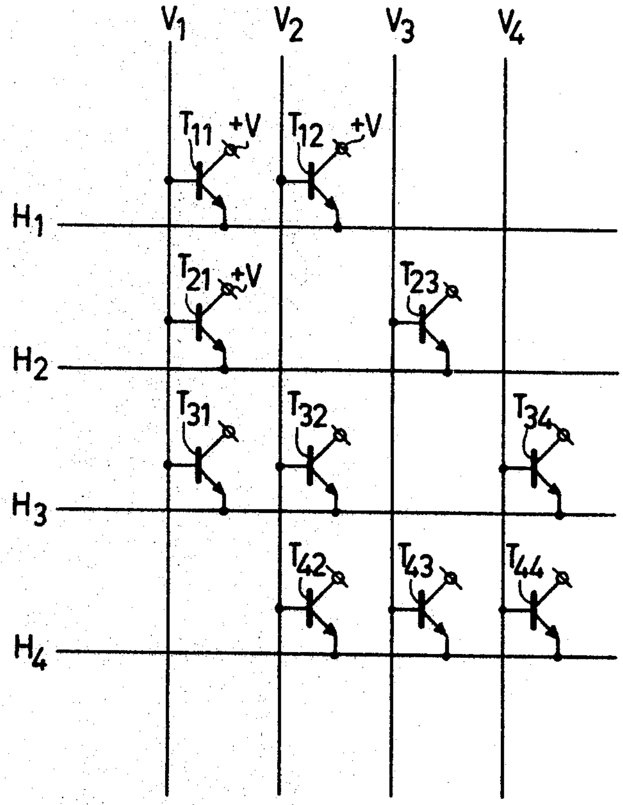
FIG. 1 shows a reading store matrix.
Figure 2:
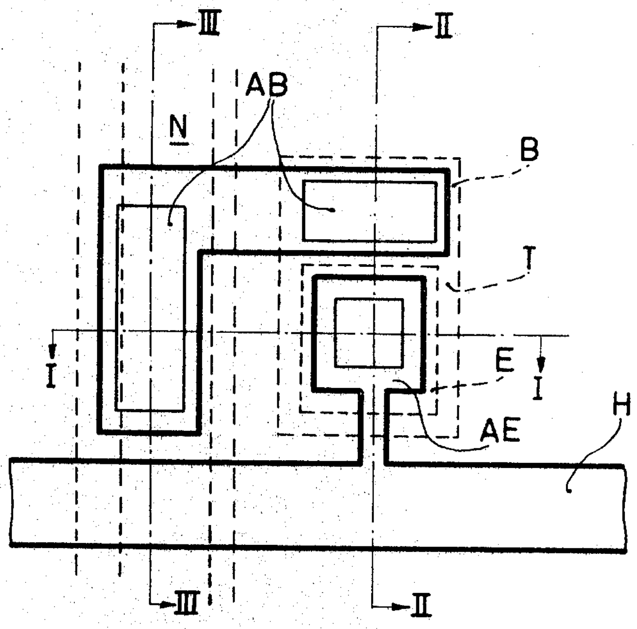
FIG. 2 is a plan view on a transistor structure at a crossing of the matrix.
Figure 3:
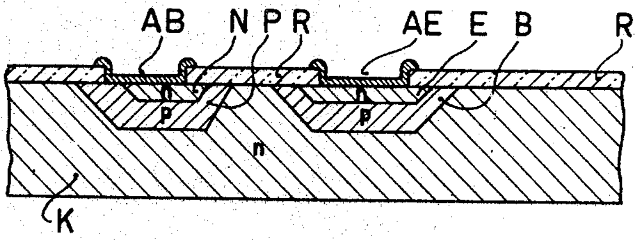
FIGS. 3, 4 and 5 are cross-sectional views of the transistor structure of FIG. 2 along the lines I—I, II—II and III—III respectively.
Figure 4:
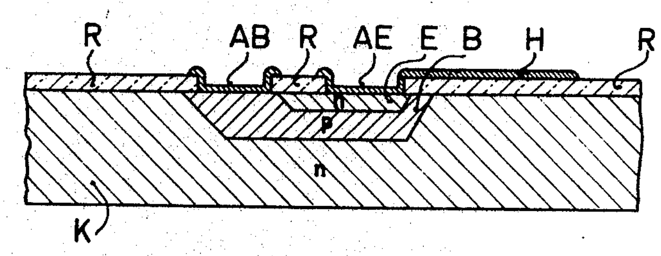
Figure 5:
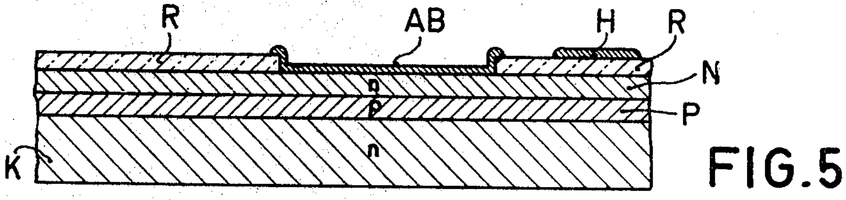

The store matrix of FIG. 1 includes a plurality of vertical conductors $V_1$ to $V_4$ and a plurality of horizontal conductors $H_1$ to $H_4$.

At predetermined crossings the horizontal and vertical conductors are coupled together by transistors $T_{11}$, $T_{12}$, etc., the bases and the emitters being connected to the vertical and horizontal conductors, respectively, and the collectors being connected together and to a voltage source +V. Thus, for example, the conductor $V_1$ is coupled to the horizontal conductors $H_1$, $H_2$ and $H_3$ via transistors $T_{11}$, $T_{21}$ and $T_{31}$, the conductor $V_2$ is connected to the conductors $H_1$, $H_3$ and $H_4$ via transistors $T_{12}$, $T_{32}$ and $T_{42}$, and so forth.

This matrix operates as follows: If a positive pulse is fed to one of the vertical conductors serving as input conductors, for example $V_2$, the transistors connected to the said conductors, in this case $T_{12}$, $T_{32}$ and $T_{42}$, will conduct and a pulse will be passed on to the horizontal output conductors $H_1$, $H_3$ and $H_4$. Due to the current amplification occurring in the transistors, the collector currents supplied to the horizontal conductors will exceed the base currents so that a control energy at the vertical conductors suffices which is comparatively low as compared with known circuits having coupling diodes at the crossings and in which the total output energy for the output conductors must be provided by the control conductors.

Thus, if a pulse is fed to an input conductor, determined code combinations of output pulses will occur as a function of the coupling pattern selected.

The number of horizontal and vertical conductors will in practice be larger, for example 10 of each.

Such a matrix of $10\times10=100$ crossings may be integrated, for example, on a silicon crystal of 1.5 mm. x 1.5 mm. as a carrier.

It is naturally not necessary for the number of input conductors to be equal to the number of output conductors.

FIGS. 2 to 5 show an example of a crossing of the conductors V and H and of a transistor T coupled to the two conductors, which are integrated on a thin plate K of n-type silicon.

The transistor T is formed by an emitter region E of n-type silicon, a base region B of p-type silicon, its collector being formed by the substrate K so that the collectors of all the transistors are connected together via the substrate K.

The conductor V then likewise has a transistor-like structure with an N region of n-type silicon and a P region of p-type silicon, which regions extend throughout the length of the conductor V along all the crossings.

The various regions are formed in known manner by successive diffusion processes. To this end, the plate K of n-type silicon is first covered with an insulating silicon oxide layer R in which apertures are formed by the photo-resist technique, whereafter the p-type regions B and P are formed by subjecting the plate to a p-diffusion. Subsequently the plate is again covered with a silicon oxide in which again apertures are made, whereafter the n-type regions E and N are formed within the regions B and P by an n-diffusion. The silicon oxide layer R serves as a mask in the diffusion processes.

Then again a silicon oxide layer is provided in which apertures are formed for establishing conductive connections to the bases and emitters of the transistors and to the vertical conductors V. Said connections are established by vapour deposition of a thin aluminium layer on the plate, whereafter the unwanted portions are removed by the photoresist technique so that the desired connections subsist. The emitter E is thus connected to the horizontal conductor H via a branch conductor AE and the base B is connected to the vertical conductor V via a branch conductor AB.

As previously mentioned, the vertical conductor V is formed by the p-type region P and the n-type region N. Especially the region N has a high conductivity, since it has been formed simultaneously with the emitter diffusion of the transistor. Furthermore, the branch conductor AB partly extends in the longitudinal direction and makes contact with the conductor V, thus resulting in a further decrease in resistance of the said conductor.

The branch conductor AB makes contact with both the regions N and P. By giving the conductor V a potential which is always negative relative to that of the substrate K, the junction layer between the region P and the substrate K is invariably cut off and the conductor V is therefore insulated from the interconnected collectors of the transistors. From FIG. 5 it may be seen that, at the crossing of the conductors V and H, the conductor H is insulated from the conductor V by an insulating silicon oxide layer R.

As previously mentioned, the coupling transistors must be active only at predetermined crossings. Now, it would be possible in the diffusion processes simply to omit the transistors which are not desired.

Preferably, however, in principle all of the transistor structures are formed, but ultimately only those are connected which must be active. Several possibilities then again arise.

It is possible, for example, to omit the connections of transistors which must be made inactive by omitting the metallic branch conductors and/or omitting the apertures of connection in the insulating layer of silicon oxide. It is also possible to provide all of the connections and remove afterwards, for example, by etching or burning certain branch conductors.

To make the transistors inactive, it is in principle not necessary to omit the connections to both electrodes. It also suffices to omit the emitter connection only while the base invariably remains connected. This affords the advantage that it is in principle not necessary for the base to be connected to a metallic branch conductor, but it is possible, for example, to make the base region B extend into the region P of the conductor V or, in other words, to manufacture them as a whole.

It is not particularly desirable to connect the emitters and not to connect the bases of transistors which must be made inactive, since the base would then assume a floating potential and hence an amplified leakage current would flow through the transistor.

It would fundamentally be possible to connect the base instead of the emitter to the metallic conductor H, in which event the metallic conductor can be formed on the bases directly over the apertures of connection, while the emitter would then be connected to the conductor V.

What is claimed is:

1. A semiconductor reading store matrix comprising a plurality of input conductors and a plurality of output conductors crossing the input conductors, a plurality of semiconductor coupling elements each having emitter, base and collector regions passing current in one direction and coupled between the input and output conductors at predetermined crossings, said coupling elements together with said conductors being integrated into a plate-shaped body, the emitter and base regions of a semiconductor coupling element being formed on one side of the plate and being connected to the output and input conductors respectively, said conductors having the form of relatively insulated electrode layers, said collector regions being connected by means of a common substrate on the other side of the plate.

2. A store matrix as claimed in claim 1 wherein said electrode layers are formed, via an insulating intermediate layer, on a plate of semiconductor material, the emitter and base regions being formed on one side of said material surface by local diffusion using the insulating layer as a mask, the electrode layers establishing electrical connections to the relevant regions through apertures in the insulating layer and the collector regions being formed by the remaining part of said material.

3. A store matrix as claimed in claim 2 wherein said emitter and base regions are formed adjacent the crossings of said conductors and are connected to these conductors via one or more branches thereof.

4. A store matrix as claimed in claim 3 wherein one group of conductors extend, at the crossings, over the insulating layer on the semiconductor body and the other group of conductors extend, at the crossings, via at least one diffusion layer forming at least one p-n junction with the collector region, beneath the insulating layer carrying the conductors of the other group.

5. A store matrix as claimed in claim 4 wherein said diffusion regions consist, at the crossings, of two diffusion regions which have the same impurity distribution as the emitter and base regions of the transistors and have been diffused simultaneously therewith, the conductors of the said other group being through-connected on each side at least to the diffusion regions of the highest conductivity.

6. A store matrix as claimed in claim 5 wherein said emitter-collector regions form a transistor structure at each crossing, said transistor structures corresponding to cossings at which the couplings are not active including an emitter region not connected to a relevant output conductor.

References Cited

UNITED STATES PATENTS

| | | | |
|---|---|---|---|
| 2,960,681 | 11/1960 | Bonn | 340—166 X |
| 2,992,409 | 7/1961 | Lawrence | 340—166 |
| 3,284,677 | 11/1966 | Haas | 317—235 |
| 3,295,031 | 12/1966 | Schmitz | 340—173 X |
| 3,321,745 | 5/1967 | Mansuetto et al. | 317—235 X |
| 3,343,002 | 9/1967 | Ragland | 307—303 |
| 3,356,860 | 12/1967 | Norman | 307—303 X |
| 3,377,513 | 4/1968 | Ashby et al. | 340—173 X |
| 3,384,879 | 5/1968 | Stahl et al. | 340—173 |

BERNARD KONICK, Primary Examiner

J. F. BREIMAYER, Assistant Examiner

U.S. Cl. X.R.

307—303; 317—235; 340—166